United States Patent Office 2,764,555
Patented Sept. 25, 1956

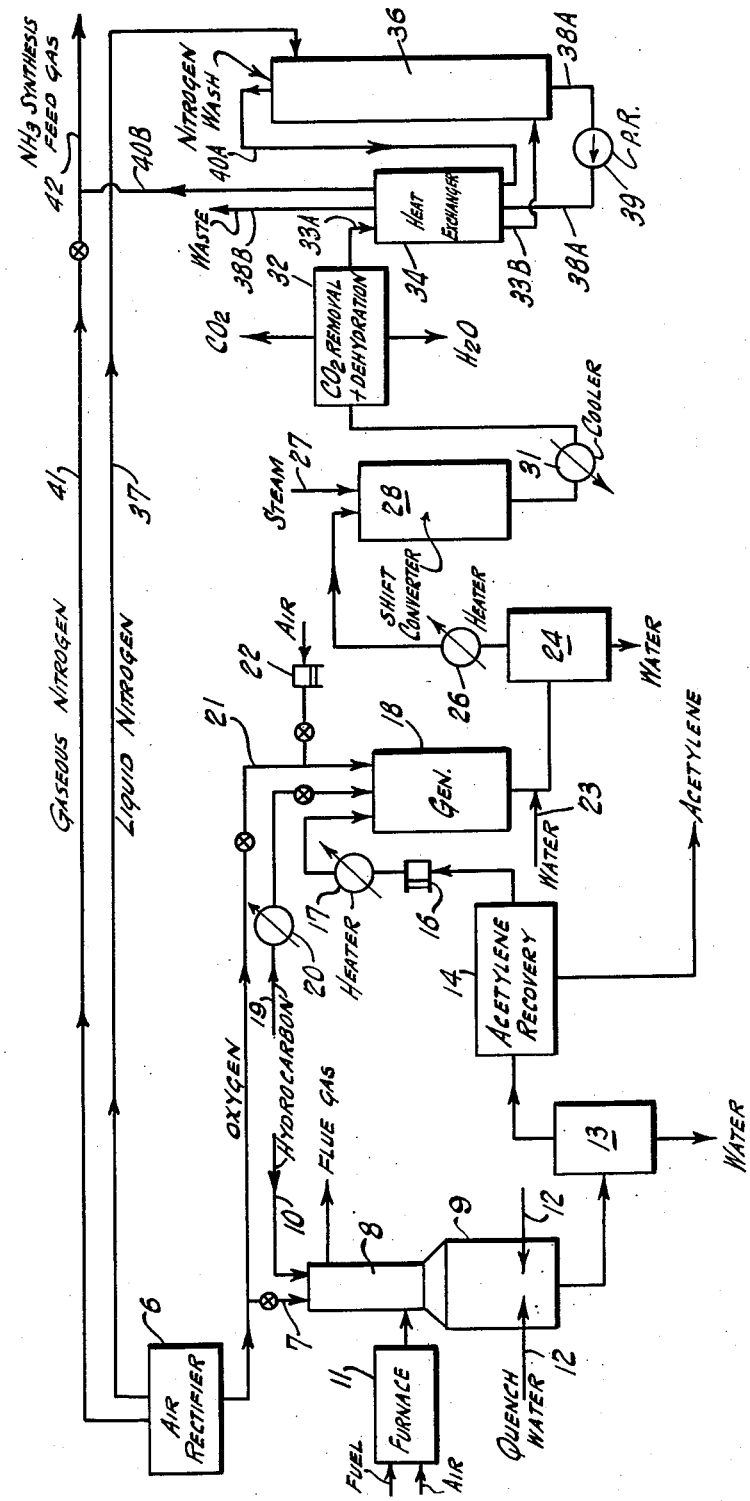

2,764,555

PROCESS FOR THE PRODUCTION OF A HYDROGEN-NITROGEN MIXTURE AND ACETYLENE

Harry V. Rees, Chappaqua, and Frederick B. Sellers, Tarrytown, N. Y., assignors to Texaco Development Corporation, New York, N. Y., a corporation of Delaware Application May 19, 1954, Serial No. 430,852

5 Claims. (Cl. 252—376)

This invention relates to a process for the production of acetylene and the simultaneous production of a mixture of high purity hydrogen and nitrogen in predetermined proportions. In one of its more specific aspects, this invention relates to an improved process for the production of acetylene by partial oxidation of a hydrocarbon and the simultaneous production of a mixture of hydrogen and nitrogen containing three parts hydrogen by volume per part of nitrogen.

Both acetylene and ammonia are commercially important chemicals. Acetylene may be produced by partial oxidation of a more saturated hydrocarbon. Hydrogen for the synthesis of ammonia may also be obtained by partial oxidation of a hydrocarbon. The advent of commercial oxygen production in tonnage quantities has made practical both the production of acetylene and the generation of ammonia synthesis feed gas by partial oxidation of hydrocarbons. Ordinarily, a plant produces one or the other, but not both simultaneously. The present invention provides an improved process by means of which acetylene and a mixture of hydrogen and nitrogen for the synthesis of ammonia are simultaneously produced. This novel process effects a savings both in fuel and operating costs and produces a nitrogen-hydrogen mixture of unusual purity.

Acetylene may be produced by reacting a hydrocarbon in gas phase with a limited amount of oxygen at a temperature in the range of from about 2,500° F. to about 3,500° F., and with a reaction time between 0.001 and 0.1 second. The quantity of oxygen relative to the quantity of hydrocarbon is suitably within the range of from 0.45 to about 0.65 mol of oxygen per atom of carbon in the hydrocarbon. The process is usually carried out at atmospheric pressure.

Quenching the reaction products is necessary to limit the reaction time and to minimize decomposition or other undesired reaction of the acetylene. The reaction may be quenched, or the reaction products "frozen," by substantially instantaneously cooling the reaction products to a temperature well below the reaction temperature, for example, to 800° F., or lower.

Preferably, substantially pure oxygen and a gasiform hydrocarbon are admixed with one another and the resulting mixture introduced into a reaction zone through a suitable flame barrier. The reaction zone contains no packing or catalyst and is so designed that the flow path of the reactants and resulting reaction products through the reactor is relatively short. The reaction products are quenched to limit the total reaction time to a period within the range of 0.001 to 0.1 second.

Normally liquid or normally gaseous hydrocarbons may be utilized in the process. Normally liquid hydrocarbons are vaporized, the vapors admixed with oxygen and passed into the reaction zone.

The hydrocarbon and oxygen may be preheated, separately or in admixture with one another, before introduction into the reaction zone. Preferably, the reactants are heated to a temperature in the range of 800 to 1,500° F. Commercially pure oxygen, e. g., oxygen obtained by rectification of air and containing in excess of 90 per cent oxygen by volume, is suitable for use in this process. Commercial oxygen often is available in a concentration in excess of 95 per cent oxygen by volume; such concentrations are preferred.

A process for the production of acetylene by partial combustion of a hydrocarbon with oxygen is disclosed in U. S. Patent No. 2,195,227.

In the synthesis of ammonia three volumes of hydrogen are required per volume of nitrogen. The hydrogen may be obtained by partial oxidation of a carbonaceous fuel. Nitrogen is abundantly available from the atmosphere.

Hydrocarbons are especially suited for the production of hydrogen by reaction with free oxygen or an oxygen-yielding compound. Partial oxidation of a hydrocarbon produces a mixture of carbon monoxide and hydrogen. The carbon monoxide may be reacted with steam to produce carbon dioxide and additional hydrogen. One volume of hydrogen is produced for each volume of carbon monoxide reacted. With the addition of nitrogen and the removal of carbon dioxide, water, residual hydrocarbon, residual carbon monoxide, and other impurities, a mixture of hydrogen and nitrogen suitable for the synthesis of ammonia may be obtained. Nitrogen may be obtained from the air either by rectification or by the use of air as a source of free oxygen in the partial oxidation reaction.

The reaction between a hydrocarbon and oxygen to produce carbon monoxide and hydrogen is preferably carried out in a compact reaction zone free from catalyst or packing and maintained at a temperature in the range of from about 2,200 to 3,200° F. The quantity of oxygen relative to the quantity of hydrocarbon is suitably within the range of from about 0.55 to about 0.75 mol of oxygen per atom of carbon in the hydrocarbon. A reaction time in the range of about 1 to 5 seconds is desirable, insuring complete consumption of the free oxygen. The process may be carried out at atmospheric pressure, but preferably is conducted at a pressure in the range of 100 to 1,000 pounds per square inch gauge. A small amount of hydrocarbon, usually in the range of 0.05 to 2 mol per cent, appears in the product gas stream.

The reaction of a hydrocarbon with free oxygen, for example, reaction of a hydrocarbon with air, oxygen-enriched air or substantially pure oxygen, is a highly exothermic reaction. Oxygen in combined form, particularly as steam or carbon dioxide, may also be used in conjunction with free oxygen to supply part of the oxygen for the reaction. The reaction of hydrocarbons with steam or carbon dioxide is endothermic. By balancing the supply of free oxygen and endothermic reactant, such as steam or carbon dioxide, the desired reaction temperature may be autogenously maintained. In general, when the hydrocarbon consists essentially of methane it is desirable to use little or no combined oxygen or endothermic reactant. With heavier hydrocarbons increased amounts of endothermic reactant may be used, particularly when the free oxygen is supplied in substantially pure form.

A preferred process for the generation of hydrogen and carbon monoxide by partial oxidation of a hydrocarbon is disclosed in U. S. Patent No. 2,582,938.

The ammonia synthesis reaction is conducted at a pressure of several thousand pounds per square inch, suitably 5,000 and higher, and an elevated temperature, suitably around 950° F., in the presence of a catalyst. A catalyst prepared from magnetic iron oxide promoted with the oxides of potassium and aluminum and subsequently reduced to metallic iron, is used commercially. In commercial operations, low conversion per pass is obtained, i. e., only a limited amount of the nitrogen-hydrogen mixture is converted to ammonia each time it passes over the catalyst. A conversion of 8 to 12 per cent per pass may be expected commercially. Unconverted nitrogen and hydrogen are recycled. It is evident that roughly 90 per cent of the feed to the converter represents recycled gas. To prevent the build-up of inert gases in the ammonia synthesis loop, it is desirable to supply a feed gas of high purity to the reactor.

In accordance with the present invention, air is rectified into an oxygen-rich fraction containing in excess of 40 volume per cent oxygen, and preferably containing in excess of 95 volume per cent oxygen, and a nitrogen fraction of at least 99 per cent purity and preferably in excess of 99.5 per cent purity. The oxygen fraction is reacted with a hydrocarbon under conditions effective for production of acetylene. The product gas from the acetylene reactor comprises hydrogen, carbon monoxide, acetylene, methane and argon. After separation of acetylene from the product gas, the resulting gas mixture, or "tail gas," is passed to a synthesis gas reaction zone wherein the hydrocarbons contained in the tail gas are substantially completely converted to carbon monoxide and hydrogen by reaction with oxygen. In a preferred embodiment of the invention, additional hydrocarbon is supplied to the synthesis gas generator and converted, together with the hydrocarbons from the tail gas, to carbon monoxide and hydrogen. The effluent gas stream from the synthesis gas generator is passed to a water gas shift reaction zone wherein carbon monoxide is converted to carbon dioxide by reaction with steam with the concomitant production of hydrogen. The effluent from the water gas shift reactor is treated to effect removal of carbon dioxide and water and is then cooled and intimately contacted with liquid nitrogen from the air rectification step whereupon the components of the gas stream other than hydrogen and nitrogen are condensed and substantially completely eliminated from the gas stream. A mixture of hydrogen and nitrogen of exceptional purity is obtained from the nitrogen wash step. The relative proportions of nitrogen and hydrogen may be adjusted to produce a mixture which is highly suitable for the synthesis of ammonia.

The process of our invention will be more readily understood with reference to the following detailed example and the accompanying drawing.

The drawing is a diagrammatic elevational view illustrating the process of our invention.

With reference to the drawing, air is separated in an air rectification plant 6 into an oxygen-rich fraction and a nitrogen fraction. In this particular example, the oxygen fraction contains approximately 95 volume per cent oxygen, and the nitrogen fraction, approximately 99.7 volume per cent nitrogen; substantially all of the argon from the air is included in the oxygen fraction. A stream of oxygen from the air rectifier 6 is passed through line 7 into a preheater 8 associated with an acetylene generator 9. A hydrocarbon, for example, natural gas, is introduced from line 10 into preheater 8. The oxygen and natural gas are preheated, e. g., to a temperature of about 1,200° F. in heater 8 by indirect heat exchange with hot gases from a furnace 11 and discharged directly into acetylene generator 9.

The acetylene generator comprises a compact, unpacked reaction zone. In this example, the acetylene generator is operated at a pressure of about 5 p. s. i. g. and at an average temperature of about 2,800° F. The mixture of hydrocarbon and oxygen is introduced into the reactor at a flow rate sufficient to produce the average inlet gas velocity in the range of 10 to 30 feet per second. The reaction products are cooled almost instantaneously to a temperature below about 200° F. by intimate contact with water introduced through lines 12. The calculated reaction time is about 0.005 second.

The effluent gas from the acetylene generator 9 comprises hydrogen, carbon monoxide, acetylene, methane, steam, and argon. The cooled gas stream, containing steam and unvaporized water, is discharged into a separator 13 where the water is separated from the gas stream. The product gas stream is passed to an acetylene recovery unit 14 in which the acetylene is separated from the other components. A number of processes for the recovery of acetylene are known. In this particular example, acetylene is removed from the gas stream by selective absorption in dimethylformamide.

The residual gas stream from the acetylene recovery unit, comprising carbon monoxide, hydrogen, argon, and methane is compressed to a pressure of about 350 p. s. i. g. by a compressor 16, passed through heater 17 where it is heated to a temperature of about 1,000° F. and introduced into a synthesis gas generator 18. Additional carbonaceous fuel, in this example, natural gas, is supplied to the generator from line 19. Oxygen from air rectification plant 6 may be introduced into generator 18 via line 21. Alternatively, air may be supplied to generator 18 from air compressor 22. Both air and oxygen may be supplied to the generator if desired.

In this particular example, both air and oxygen are supplied to the generator. The amount of air is less than the amount required to supply all of the nitrogen for the ammonia synthesis feed gas. Additional nitrogen is added to the gas stream in a subsequent nitrogen wash step which will be described hereinafter. The gas entering through line 19 is heated in heater 20, in this example, to a temperature of 1,000 F. In this example, the gas generator is operated at a pressure of approximately 350 p. s. i. g. and at a temperature of about 2,600° F.

The gas generator 18 is a compact reaction zone free from packing and catalyst. A number of carbonaceous fuels, including coal, coke, oil, coke oven gas, refinery gases, and natural gas, are suitable fuels for the production of synthesis gas in gas generator 18. Endothermic reactants, particularly steam or carbon dioxide, may also be supplied to gas generator 18. Steam, carbon dioxide, or both, may be mixed with the fuel entering line 19 or separately introduced to the generator.

The gas stream from generator 18 is contacted with water from line 23 immediately upon leaving the reaction zone. Sufficient water is added to the hot gas stream to cool the gas substantially instantaneously to a temperature below 800° F. In this particular example, the gas is cooled to a temperature of about 450° F. by the addition of 0.75 mol of water per mol of product gas. Part of the water is vaporized saturating the gas stream with water vapor. Excess water is separated from the gas stream in separator 24. The raw synthesis gas contains hydrogen, carbon monoxide, carbon dioxide, water vapor, argon, and a small amount of methane. Some nitrogen is contained in the raw synthesis gas, the quantity of nitrogen depending upon the purity of the oxygen from the oxygen plant and the amount of air, if any, supplied to the gas generator.

Raw synthesis gas from generator 18 is reheated in heater 26 to a temperature of about 700° F. and introduced together with steam from line 27 at a temperature of about 750° F. into a shift converter 28. In the shift converter, the carbon monoxide contained in the gas stream is reacted with steam in the presence of an iron catalyst with substantially complete conversion of the carbon monoxide to carbon dioxide and the simultaneous formation of an equivalent amount of hydrogen. The product gas from the shift converter is at a temperature of about 750° F. and contains about 2 per cent residual carbon monoxide on a dry, carbon dioxide-free basis. The product gas stream from the shift converter is cooled in cooler 31 and passed to a purification unit 32 where it is subjected to treatment for removal of water and carbon dioxide.

In this particular example, the gas stream is cooled in cooler 31 to a temperature of 100° F. Condensate is separated from the gas stream in unit 32, and the gas stream is then contacted with monoethanolamine solution effecting substantially complete removal of carbon dioxide. The residual gas is cooled to a temperature of about 40° F. condensing additional water from the gas stream. The partially dried gas stream is subjected to chemical dehydration by passing the gas over alumina. It will be evident to one skilled in the art that other desiccants, e. g., silica gel, may be employed for dehydration.

The dry gas stream from purification system 32 consists essentially of hydrogen and contains small amounts of carbon monoxide, methane and argon. The gas contains some nitrogen from the oxygen stream and from the air (if any) supplied to the synthesis gas generator. The dry gas stream is passed through line 33A through a heat exchanger 34 and then through line 33B to a nitrogen wash tower 36. In passing through heat exchanger 34, the gas stream is cooled to a temperature sufficiently low to condense argon. In this example, the gas stream is cooled to a temperature of about —315° F.

In heat exchanger 34 the final traces of water and carbon dioxide are condensed from the gas stream entering the heat exchanger through line 33A and deposited as solids on the surfaces of the heat exchanger elements. To prevent build-up of these deposits to the point where the efficiency of the heat exchanger is seriously impaired, a reversing type heat exchanger, well known in the art of air rectification, is preferably employed. In the reversing heat exchanger, provision is made for periodically interchanging the passages provided for the incoming gas stream from line 33A and the outgoing waste gas leaving the heat exchanger through line 38B. Gas from line 33A flows in one direction through one of the passages in the heat exchanger during the first half of the cycle, then, after reversal of the gas streams, the waste gas flows through the same passage in the opposite direction. The waste gas thus serves as a scavenger for the removal of solid deposits from the heat exchanger. Other gases may be used for flushing the heat exchanger elements. Nitrogen, for example, which is available from air rectifier 6, is suitable for flushing the solid deposits from the heat exchanger.

In the nitrogen wash tower 36, the cooled gas stream entering through line 33B is countercurrently contacted with liquid nitrogen from the air rectification plant 6. Liquid nitrogen is supplied to the top of the nitrogen wash tower by way of line 37. The nitrogen wash tower is provided with trays to insure intimate countercurrent contact between the liquid nitrogen and the gas stream. Liquid nitrogen flowing downwardly through the tower is partially vaporized, condensing argon, carbon monoxide and methane. A stream of liquid comprising nitrogen, argon, carbon monoxide and methane is withdrawn through line 38A from the bottom of the nitrogen wash tower passed through a pressure-reducing valve 39 into heat exchanger 34 where it passes in heat exchange with the incoming gas stream from line 33A. The nitrogen-argon-carbon monoxide-methane stream leaves the heat exchanger through line 38B as a waste gas stream.

From the top of the nitrogen wash tower is withdrawn a gaseous mixture of nitrogen and hydrogen substantially completely free from other components. In this example, a purified gas stream consisting of a mixture of hydrogen and nitrogen containing less than 10 parts per million of argon and less than 1 part per million of carbon monoxide is obtained overhead of the nitrogen wash tower. The nitrogen-hydrogen mixture is passed through line 40A to heat exchanger 34 passed in heat exchange with the incoming gas stream from 33A and discharged through line 40B. Additional nitrogen from air rectifier 6 may be supplied via line 41 and mixed with the hydrogen-nitrogen mixture from line 40B to form an ammonia synthesis feed gas stream containing three parts hydrogen per part of nitrogen by volume. The ammonia synthesis feed gas stream is discharged through line 42 to ammonia synthesis reactors, not illustrated in the drawing.

EXAMPLE

Natural gas of the following composition is employed:

*Natural gas feed*

| Component | Mol percent |
|---|---|
| Methane | 93.1 |
| Ethane | 4.2 |
| Propane | 1.5 |
| $C_4$'s and higher hydrocarbons | 0.4 |
| Carbon dioxide | 0.6 |
| Nitrogen | 0.2 |

21,646 SCFH (standard cubic feet per hour) of natural gas and 13,001 SCFH of oxygen (97 per cent purity) are preheated to 1,300° F. and reacted at 2,800° F. and 5 p. s. i. g. The reaction products are rapidly quenched with water to 180° F. to produce 43,050 SCFH of product gas which has the following composition on a dry basis:

*Acetylene reactor product*

| Component | Mol percent |
|---|---|
| Hydrogen | 56.2 |
| Carbon monoxide | 24.7 |
| Acetylene | 9.5 |
| Higher acetylenes | 0.4 |
| Methane and higher hydrocarbons | 5.0 |
| Carbon dioxide | 2.9 |
| Oxygen, nitrogen and argon | 1.3 |

This gas is directed to an acetylene recovery unit where the acetylene, higher acetylenes and higher hydrocarbons are removed from the gas stream by absorption in dimethylformamide. 37,900 SCFH of "tail gas" of the following composition, on a dry basis, are obtained.

*Acetylene tail gas*

| Component | Mol percent |
|---|---|
| Hydrogen | 62.7 |
| Carbon monoxide | 27.6 |
| Carbon dioxide | 3.1 |
| Methane | 5.5 |
| Nitrogen and argon | 1.1 |

The acetylene tail gas is compressed and combined with 37,900 SCFH of additional natural gas and 27,023 SCFH of 97 per cent purity oxygen and charged to a synthesis gas generator. The mixed hydrocarbon gases and the oxygen are separately preheated to temperatures of 865° F. and 260° F., respectively, before entering the generator. Partial combustion occurs in the generator at about 2,500° F. and 425 p. s. i. g. to produce 160,507 SCFH of raw synthesis gas, having the following composition on a dry basis:

*Raw synthesis gas*

| Component | Mol percent |
|---|---|
| Carbon monoxide | 34.6 |
| Hydrogen | 62.7 |
| Carbon dioxide | 1.2 |
| Methane | 0.6 |
| Nitrogen and argon | 0.9 |

The raw synthesis gas is cooled to about 100° F. by direct quenching with water. The water, which removes any small amounts of carbon produced in the synthesis gas generator, is discarded and the gas reheated to about 750° F. The hot gas is directed to a shift converter, along with sufficient steam to convert substantially all the carbon monoxide to carbon dioxide with the production of an equivalent amount of hydrogen. The product gas from the shift converter is cooled and directed to a purification unit for removal of the carbon dioxide. The resulting gas stream amounts to 158,581 SCFH and has the following composition on a dry basis:

*Feed to nitrogen wash*

| Component | Mol percent |
|---|---|
| Hydrogen | 96.8 |
| Methane | 0.6 |
| Carbon monoxide | 1.7 |
| Nitrogen and argon | 0.9 |

This gas stream is then directed to a liquid nitrogen wash unit where the residual methane and carbon monoxide are removed by liquefaction by contact with liquid nitrogen of 99.7 per cent purity from the air rectification step to produce a mixture of nitrogen and hydrogen substantially completely free from other constitutents. Gaseous nitrogen of 99.7 per cent purity from the air rectification step is added to produce ammonia synthesis feed gas. The gas directed to ammonia synthesis amounts to 202,984 SCFH and has the following composition:

*Ammonia synthesis feed gas*

| Component | Mol percent |
|---|---|
| Hydrogen | 75.0 |
| Nitrogen | 25.0 |

(Impurities less than 60 parts per million.)

Obviously, many modifications and variations of the invention, as hereinbefore set forth, may be made without departing from the spirit and scope thereof, and therefore only such limitations should be imposed as are indicated in the appended claims.

We claim:

1. A process for the production of a mixture of nitrogen and hydrogen and the simultaneous production of acetylene which comprises reacting, for .001–0.1 second at 2500–3500° F. and substantially atmospheric pressure, a gasiform hydrocarbon with oxygen in the ratio of 0.45–0.65 mols of oxygen per carbon atom in said hydrocarbon, thereby producing a gaseous product comprising a substantial quantity of acetylene in association with carbon monoxide, hydrogen and appreciable methane; removing acetylene from said gaseous product by solvent absorption to leave a residue gas consisting essentially of methane, carbon monoxide and hydrogen; subjecting said methane in admixture with said carbon monoxide and said hydrogen to partial combustion in a compact, unpacked synthesis gas generation zone for 1–5 seconds at 2200–3200° F. and pressure from about atmospheric to about 1000 p. s. i. g. with an oxygen-containing gas in the ratio of 0.55–0.75 mol of oxygen per atom of carbon in the hydrocarbon feed to said synthesis gas generation zone, thereby converting methane to gaseous reaction products comprising carbon monoxide and hydrogen; converting carbon monoxide in the effluent from said synthesis gas generation zone to carbon dioxide with concomitant production of hydrogen by reaction with steam in a water gas shift reaction zone; removing carbon dioxide and water vapor from the resulting gas mixture from said water gas shift reaction zone; subjecting the resulting gas stream comprising hydrogen and nitrogen containing minor amounts of residual carbon monoxide and methane from previous steps to contact with substantially pure nitrogen in liquid phase whereby said carbon monoxide and methane are condensed from said gas stream; and separating a gaseous mixture of nitrogen and hydrogen substantially completely free of other constituents from the resulting liquid mixture comprising nitrogen, carbon monoxide and hydrocarbon.

2. A process as defined in claim 1 wherein additional hydrocarbon is supplied to said synthesis gas generation zone and subjected to reaction with said oxygen-containing gas producing carbon monoxide and hydrogen.

3. A process as defined in claim 1 wherein said oxygen-containing gas supplied to said synthesis gas generation zone comprises air.

4. A process as defined in claim 3 wherein the quantity of nitrogen supplied to said synthesis gas generation zone from air is less than the quantity of nitrogen in the final mixture of nitrogen and hydrogen.

5. A process as defined in claim 3 wherein said oxygen-containing gas supplied to said synthesis gas generation zone is oxygen enriched air.

References Cited in the file of this patent

UNITED STATES PATENTS

| 1,716,813 | Casale | June 11, 1929 |
| 1,957,744 | Wietzel et al. | May 8, 1934 |
| 2,679,540 | Berg | May 25, 1954 |
| 2,679,541 | Berg | May 25, 1954 |

FOREIGN PATENTS

| 231,218 | Great Britain | Mar. 26, 1925 |